United States Patent
Kawatani (10) Patent No.: US 7,194,461 B2
(45) Date of Patent: Mar. 20, 2007

(54) DOCUMENT AND INFORMATION RETRIEVAL METHOD AND APPARATUS

(75) Inventor: Takahiko Kawatani, Yokohama Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 10/469,586

(22) PCT Filed: Mar. 1, 2002

(86) PCT No.: PCT/US02/06053

§ 371 (c)(1),
(2), (4) Date: Sep. 2, 2003

(87) PCT Pub. No.: WO02/071277

PCT Pub. Date: Sep. 12, 2002

(65) Prior Publication Data
US 2004/0078363 A1 Apr. 22, 2004

(30) Foreign Application Priority Data
Mar. 2, 2001 (JP) ............................. 2001-58899

(51) Int. Cl.
*G06F 17/30* (2006.01)
*G06F 7/00* (2006.01)
(52) U.S. Cl. ........................... 707/4; 707/104.1
(58) Field of Classification Search ............ 707/1–6, 707/10, 104.1
See application file for complete search history.

(56) References Cited

U.S. PATENT DOCUMENTS

| | | | |
|---|---|---|---|
| 5,704,060 A | 12/1997 | Del Monte | |
| 5,794,178 A | 8/1998 | Caid et al. | |
| 6,578,031 B1 * | 6/2003 | Washizawa | 707/6 |
| 6,678,690 B2 * | 1/2004 | Kobayashi et al. | 707/101 |
| 2003/0028558 A1 * | 2/2003 | Kawatani | 707/500 |
| 2004/0068396 A1 * | 4/2004 | Kawatani | 703/2 |

OTHER PUBLICATIONS

Kraft et al. the Use of Genetic Programing to Build Queries for Information Retrieval, Proceedings or the First IEEE Conference on Evolutionary Computation, Jun. 1994, IEEE World conference no Computational Intelligence, pp. 468-473.*

McCabe et al; "syetem Fusion for Improving Performance in Information Retrieval System"; Intermnational Conference on Information Technology, Coding Computing, Apr. 2, 2001, pp. 639-643.*

McCabe et al; "System Fusion for Improving Performance in Information Retrieval System"; International Conference on Information technology, Coding and Computing, Apr. 2, 2001, pp. 639-643.

* cited by examiner

*Primary Examiner*—John Cottingham
*Assistant Examiner*—Susan Rayyan (57) ABSTRACT

A data procassing unit in programmed to retrieve a document item and/or an information item from a plurality of document items and/or information items. Each of the items is identified by an index vector. The retrieval (15) is in response to a query (11) including plural query terms related to each other by Boolean logic. The program causes the data processing unit to transform the query into vector form through matrix calculations (12) and to measure the similarities of the item index vectors and the vector form of the query to determine which of the items correspond with the query.

16 Claims, 7 Drawing Sheets

DOCUMENT AND INFORMATION RETRIEVAL METHOD AND APPARATUS

BACKGROUND OF THE INVENTION

1. Field of the Invention

The present invention relates to document and/or information retrieval in which document and/or information relevant to an input query is retrieved and more particularly to a retrieval method and apparatus wherein an input query including plural terms related to each other by Boolean logic are transformed into vector form.

2. Description of the Related Art

With the increase of information circulation in recent years, information retrieval technology is becoming more and more important. The Boolean model, the extended Boolean model, the fuzzy set model, the vector space model, the probabilistic model, and the network model are prior art examples of models for information retrieval technology,. These prior art information retrieval models are detailed in Takenobu Tokunaga: "Information Retrieval and Language Processing" (University of Tokyo. Press, 1999) and Ricardo Baeza-Yates and Berthier Ribeiro-Neto: "Modern Information Retrieval" (Addison-Wesley, 1999). Among them, the Boolean model is the most classic and fundamental model, while the vector space model is the most popular model. With the Boolean model, relevant documents are located by logically collating terms of an input query, described by a Boolean logic operator, such as AND, OR or NOT, with query terms associated with each document so as to locate relevant documents. With the vector space model, a vector component describes and corresponds to each term of an input query. The values of the vector components associated with the input query are set at one. Each document is described by a document vector having a value of one or zero according to the presence or absence of the corresponding query term in the document. The component values are often weighted. The similarity of the query vector with a document vector is measured to indicate the degree of relevance between the query and the document.

The vector space model is generally considered superior to the Boolean model in:

(1) ease of weighting any important query term;
(2) ease of sorting and displaying retrieved results in accordance with the degrees of relevance to the user's query; and
(3) ease of feeding back to a retrieval process documents that the user judged as desirable or as undesirable among the retrieved results, so as to facilitate the acquisition of information desired by the user.

The vector space model does not have the ability to describe the logical relationship between the user and document query terms. A feature of the Boolean model is that the logical relationship is established by Boolean logic functions, e.g., the Boolean AND or OR functions. As stated in the reference "Information Retrieval and Language Processing", to retrieve a user's query for information about "Restaurant of Chinese food or Italian food located at Shibuya", the Boolean model can exactly describe the user's query by the logical expression:

Shibuya AND (Chinese food OR Italian food) AND Restaurant

However, the Boolean model is not able to weight the query terms according to importance to the user, and the retrieved results cannot be sorted in accordance with the degrees of relevance.

The vector space model describes such a user's query as:
{Shibuya Chinese food Italian food Restaurant}

With the vector space model, it is possible to weight the query terms that are important to the user and to sort retrieved results, but there is the possibility that the Chinese restaurants and Italian restaurants located in places other than Shibuya will be retrieved.

To alleviate the disadvantages of the Boolean model as stated above, the extended Boolean model has been proposed. The extended Boolean model overcomes the problems associated with items (1) and (2) but does not solve the problem of item (3). I am unaware of a retrieval model having the desirable properties of the vector and Boolean models.

SUMMARY OF THE INVENTION

In accordance with one aspect of the invention a desired document item or information item is retrieved from a plurality of document items and/or information items in response to a query. The items are identified by item index vectors. The query includes plural query terms related to each other in Boolean logic form. The method comprises transforming the query terms in Boolean logic form into a transformed vector form, and retrieving the desired item in response to similarity measurements of (1) the transformed vector form of the query terms and (2) the index vectors.

Preferably, the transforming step includes calculating (1) a square sum matrix by using a plurality of first index vectors having components indicating the presence or absence of each of the plural query terms, and (2) calculating eigenvectors and eigenvalues of the square sum matrix. The square sum matrix is calculated on the basis of all the first index vectors which are generated from the query.

The transforming step further preferably includes selecting basis vectors from the eigenvectors, wherein the basis vectors constitute a subspace.

The similarity measurements preferably include calculating inner products between the first index vectors and the basis vectors, and weighted coefficients employing the eigenvalues.

The retrieving step preferably includes comparing the similarity measurement with a predetermined threshold to determine whether or not each of the items is relevant to the query. The weighted coefficients and the threshold are preferably varied to maximize a predetermined evaluation measure.

The square sum matrix is preferably modified in response to at least one of (1) the first index vector being judged as being irrelevant in spite of being relevant to the query, and (2) the first index vector being judged as being relevant in spite of being irrelevant to the query.

The square sum matrix is preferably modified in one embodiment in response to at least one of a user deciding (1) that a retrieval item agrees with the query, and (2) that a retrieval item does not agree with the query.

In another embodiment, the square sum matrix is modified on the basis of another index vector having a component that indicates the presence or absence of each index term included in each of the items.

A feedback vector is preferably calculated by using an average vector of the another index vectors which are included in the item judged by the user to agree with the user's request, or an average vector of the another index vectors which are included in the item judged by the user to disagree. A second similarity between each of the another index vectors and the feedback vector is measured. A third similarity is calculated by using the first mentioned similarity measurement and the second similarity measurement. The relevance of each item to the query is judged by comparing the third similarity measurement with a predetermined threshold.

The square sum matrix preferably is calculated in accordance with:

$$S = \sum_{f_i \in \Omega_1} f_i f_i^T$$

where, $f_i$ denotes index vectors of the items relevant to the query, and $\Omega_1$ denotes a set of all the first index vectors which the relevant items can take.

The retrieval is preferably preformed with an apparatus comprising:

(1) an input unit for accepting a query including plural query terms related to each other by Boolean logic, and (2) a data processing unit connected to be responsive to the input unit. The data processing unit is programmed to be responsive to the query for (1) transforming the query into vector form, and (2) measuring the similarities of the item index vectors and the vector form of the query to determine which of the items correspond with the query. An output device connected to be responsive to the data processing unit provides an indication of the determination of which of the items correspond with the query.

The data processing unit is preferably programmed to:

(1) calculate a square sum matrix by using (a) a first index vector having a component indicating the presence or absence of each query term included in the query, and (b) all of the first index vectors which documents relevant to the query can take; (2) calculate eigenvectors and eigenvalues of the square sum matrix; (3) select basis vectors which constitute a subspace from the eigenvectors; (4) measure a first similarity between each of the items and the query on the basis of inner products between the item index vectors and the basis vectors, and weighted coefficients employing the eigenvalues; (5) compare the first similarity with a predetermined threshold so as to determine whether or not each of the items is relevant to the query; and (6) output a result of the judgement to the output unit.

The data processing unit is preferably programmed to modify the square sum matrix in response to at least one of (1) the first index vector being judged irrelevant in spite of being relevant to the query, and (2) the first index vector being judged relevant in spite of being irrelevant to the query.

Another aspect of the invention relates to a program for controlling a data processing unit used to assist in retrieving a document item and/or an information item from a plurality of document items and/or information items. Each of the items is identified by an index vector. The retrieval is in response to a query including plural query terms related to each other by Boolean logic. The program causes the data processing unit to transform the query into vector form and to measure the similarities of the item index vectors and the vector form of the query to determine which of the items correspond with the query.

In accordance with one embodiment, the program causes the data processing unit to modify the square sum matrix in response to at least one of (a) the first index vector being judged irrelevant in spite of being relevant to the query and (2) the first index vector being judged relevant in spite of being irrelevant to the query.

The above and still further objects, features and advantages of the present invention will become apparent upon consideration of the following detailed descriptions of several specific embodiments thereof, especially when taken in conjunction with the accompanying drawings.

DETAILED DESCRIPTION OF THE DRAWING

Before describing the preferred embodiments of the invention, the theory associated with the invention is discussed.

Let $Q(w_1, \ldots, w_N)$ (hereinafter, referred to as Q) denote a query based on the Boolean model. An index vector (hereafter, simply called "vector" in some cases) of a document $i$ is represented by $f_i^T = (b_1, \ldots, b_N)$, where T indicates transpose and $b_n$ denotes a binary variable (1 or 0) which indicates whether or not $w_n$ is extracted as an index term in document $i$. The relevance of document $i$ to query Q is determined by matching the vector $f_i$ for document $i$ and several N-dimensional vectors obtained by transforming Boolean query Q into a vector.

To transform the Boolean query Q into a vector, assume that Boolean query Q consists of N query terms, sometimes referred to as index terms. In such a case, query Q can be theoretically transformed into $2^N - 1$ index vectors. Let $\Omega_1$ denote the set of all possible index vectors which documents relevant to the query Q can take among the $2^N - 1$ index vectors, and let $\Omega_0$ denote the set of index vectors which are not relevant to query Q; therefore $\Omega_0$ does not include $\Omega_1$.

By way of example, consider the previously mentioned Boolean model. The input query Q is assumed to be "Shibuya AND(Chinese food OR Italian food)AND Restaurant". The set, $\Omega_1$, of all the possible index vectors which the documents relevant to this input query Q can take as stated above, includes three vectors $f_1^T = (1011)$, $f_2^T = (1101)$ and $f_3^T = (1111)$. In this example, (1) Shibuya, (2) Chinese food, (3) Italian food and (4) Restaurant are respectively transformed into the first, second, third and fourth terms of each of $f_1^T$, $f_2^T$ and $f_3^T$. Because Shibuya and Restaurant must be present in the document to be retrieved, the first and fourth terms of each of $f_1^T$, $f_2^T$ and $f_3^T$ have the binary value "1". In $f_1^T$, the second and third terms are respectively the binary values 0 and 1, indicating that the document to be retrieved does not have Chinese food, but does have Italian food. In $f_2^T$, the second and third terms are respectively the binary values 1 and 0, indicating that the document to be retrieved has Chinese food, but does not have Italian food. In $f_3^T$, the second and third terms are respectively the binary values 1 and 1, indicating that the document to be retrieved has Chinese and Italian food. The vector set $\Omega_0$ is the set of vectors other than the three vectors $f_1^T$, $f_2^T$ and $f_3^T$; $f_1^T$, $f_2^T$ and $f_3^T$ are defined by $\Omega_1$, so $\Omega_1$ is mutually exclusive of $\Omega_0$.

Hence, the index vectors of all possible index vectors are included in set $\Omega_0$ or set $\Omega_1$. In consequence, whether or not any document i is relevant to query Q is determined by which of the sets $\Omega_1$ and $\Omega_0$ the vector $f_i$ of document i is included in. The similarity between the vector $f_1$ for each document i and the vector set $\Omega_1$ that is derived from query Q is measured. If the similarity of vector $f_3$ for a particular document j and the vector set $\Omega_1$ that is derived from query Q exceeds a predetermined value, vector $f_j$ of document j is indicated as a member of set $\Omega_1$. The Sentence Vector Set Model (SVSM) similarity (as disclosed in Takahiko Kawatani: "Text Processing by Sentence Vector Set Model", Research Report on Natural Language Processing, Information Processing Society of Japan, 2000-NL-140, pp.31–38 (2000)) is employed as the similarity scale. According to the SVSM-similarity, the similarity between a vector $f_i$ and a vector set $\Omega_1$ can be exactly measured using the eigenvectors and eigenvalues of a square sum matrix (to be described later) of all vectors included in set $\Omega_1$.

Figure 5:
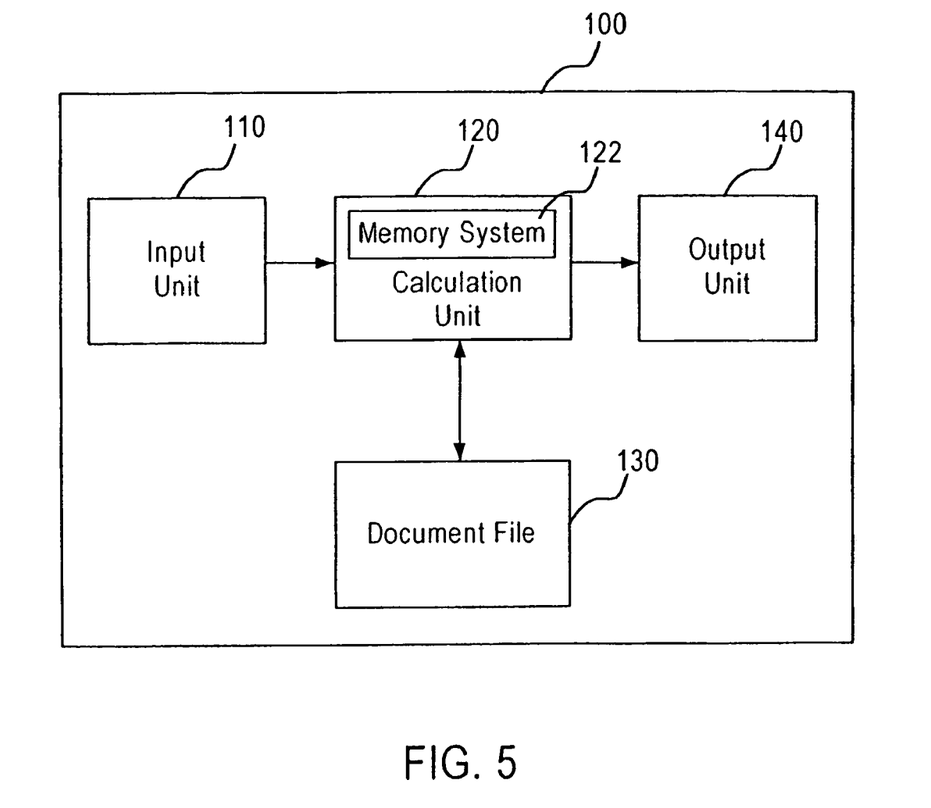
FIG. 5 is a block diagram of a preferred embodiment of document retrieval apparatus according to the present invention.

Document retrieval apparatus 100, FIG. 5, is a computer system including input unit 110 which responds to user inputs representing a Boolean query Q for retrieving any desired document. Alternatively, a feedback arrangement (not shown) supplies feedback information based on retrieved results to input unit 110. Input unit 110 derives an output signal indicative of the query supplied to input unit 110.

The output signal of unit 110 is connected to an input of calculation unit 120. Unit 120, typically a central processing unit of a programmed general purpose computer, retrieves documents stored in a document file 130 in response to the query from input unit 110 and index information in the stored documents. Calculating unit 120 includes a memory system 122 comprising a random access memory (RAM) and a programmed memory for causing unit 120 to execute the steps of FIGS. 1, 2, 3 or 4. Unit 120 responds to the output signal of unit 110 and the index information in the stored documents and the programmed memory of system 122 to deliver the retrieved results to output unit 140.

Figure 1A:
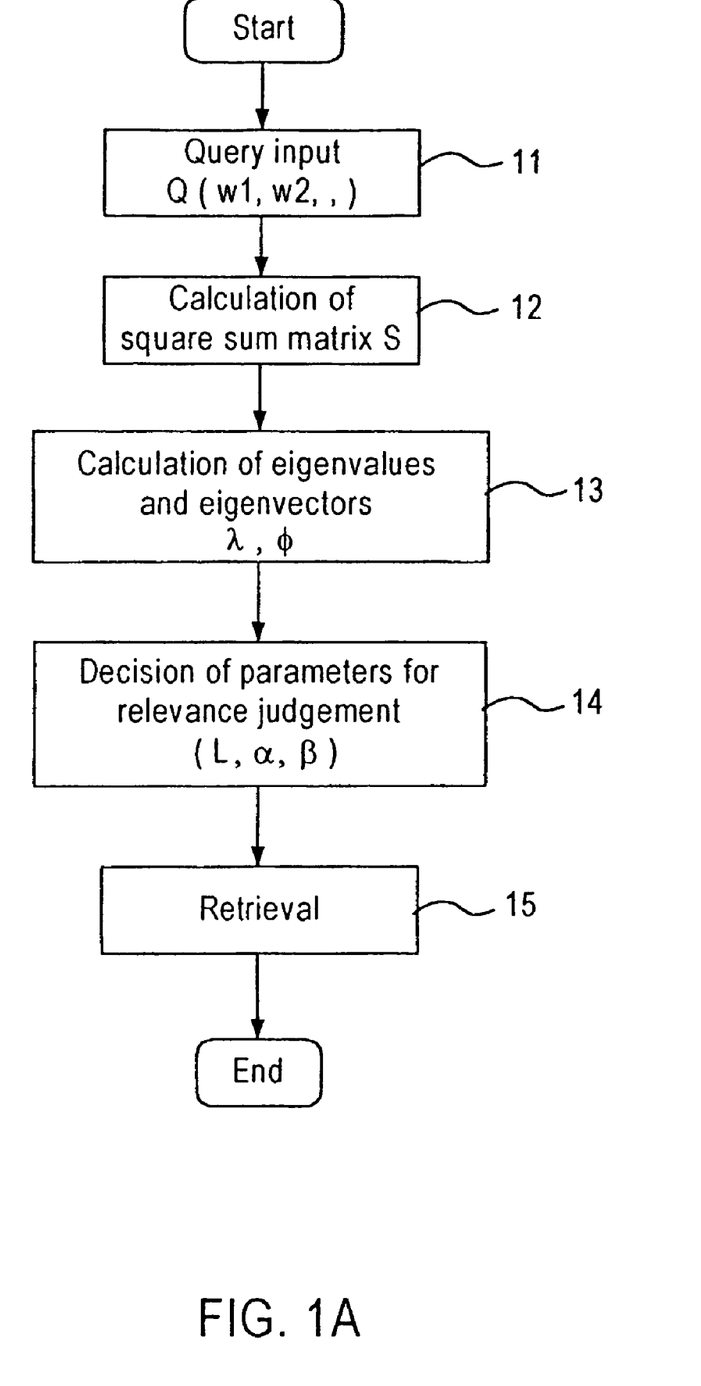
FIG. 1A is a flow chart of operations of a first preferred embodiment of the present invention.
Figure 1B:
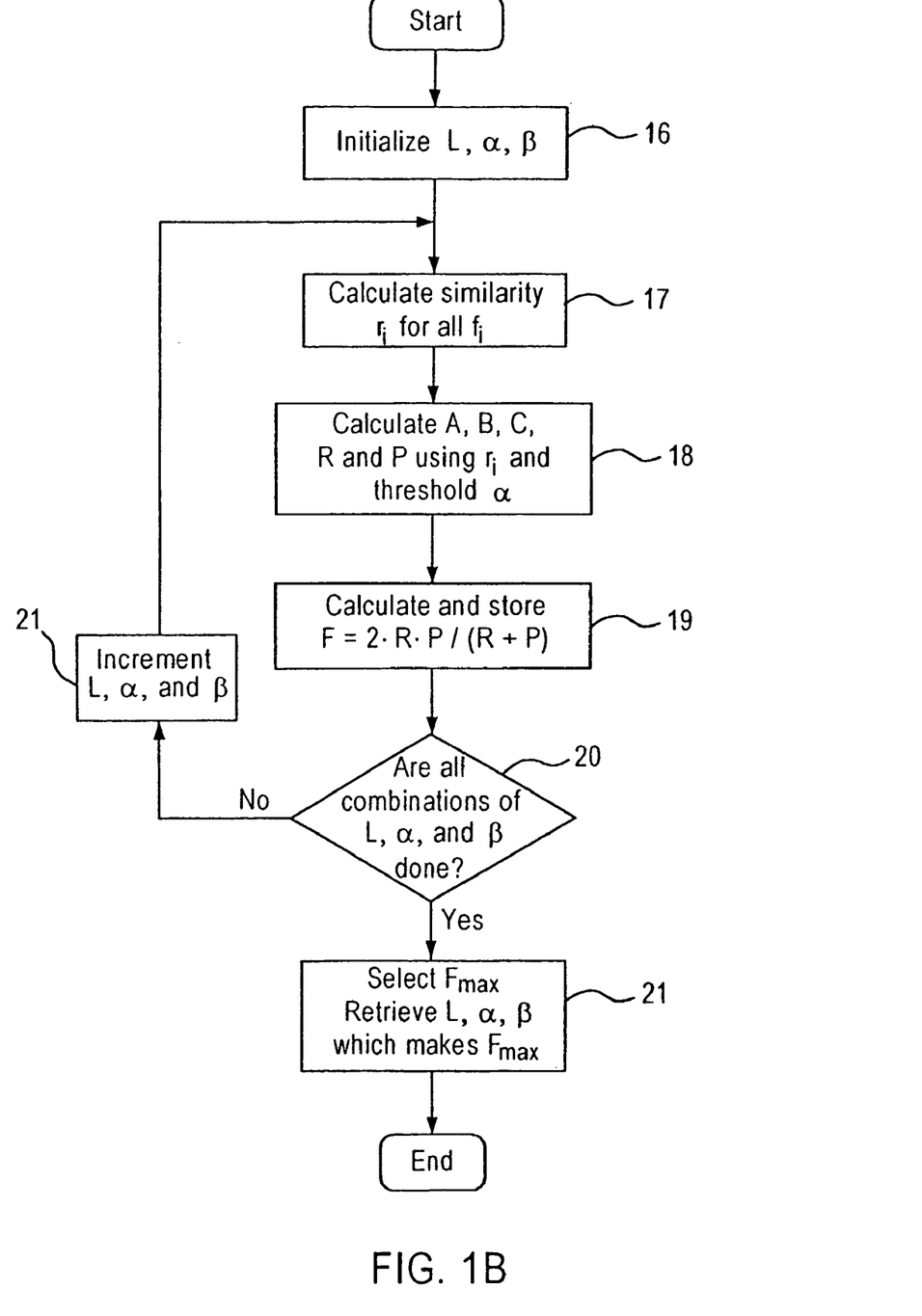
FIG. 1B is a flow chart helpful in describing how the step of determining parameters for relevance judgement of FIG. 1A is preferably performed.

FIGS. 1A and 1B together are a flow chart of the steps that calculation unit 120 performs in accordance with a first embodiment of the present invention, i.e., the steps stored in the programmed memory of memory system 122.

During step 11, calculating unit 120 responds to query Q in Boolean logic form from input unit 110. Then, during step 12, calculating unit 120 calculates a square sum matrix, and during step 13 unit 120 calculates eigenvalues and eigenvectors of a transformation from Boolean logic into vector form of the relationship between the input query and the index information in the documents that file 130 stores. During step 14, unit 120 determines parameters for relevance of the input query to the index information in the documents that file 130 stores. Unit 120 executes a retrieval operation during step 15.

In operation, input unit 110 derives query Q in Boolean logic form during query input step 11. $\Omega_1$ denotes the set of all possible index vectors which documents relevant to the query Q can take. During square sum matrix calculation step 12, unit 120 calculates the square sum matrix S from all the vectors included in the vector set $\Omega_1$, in accordance with Equation (1):

$$S = \sum_{f_i \in \Omega_1} f_i f_i^T \qquad (1),$$

where $f_i$ is an index vector in the vector set $\Omega_1$. For the previous example about Shibuya, Chinese food, Italian food, and restaurants, $$S = \sum_{f_i \in \Omega_1} f_i f_i^T = \sum_{\lambda=1}^{3} f_i f_i^T$$

$$= \begin{bmatrix} 1 \\ 0 \\ 1 \\ 1 \end{bmatrix}[1011] + \begin{bmatrix} 1 \\ 1 \\ 0 \\ 1 \end{bmatrix}[1101] + \begin{bmatrix} 1 \\ 1 \\ 1 \\ 1 \end{bmatrix}[1111]$$

$$= \begin{bmatrix} 1011 \\ 0000 \\ 1011 \\ 1011 \end{bmatrix} + \begin{bmatrix} 1101 \\ 1101 \\ 0000 \\ 1101 \end{bmatrix} + \begin{bmatrix} 1111 \\ 1111 \\ 1111 \\ 1111 \end{bmatrix}$$

$$= \begin{bmatrix} 3223 \\ 2212 \\ 2122 \\ 3223 \end{bmatrix}$$

Unit 120 calculates the eigenvalues and eigenvectors of square sum matrix S during eigenvalue/eigenvector calculation step 13.

Let $\lambda_m$ and $\phi_m$ denote the m-th eigenvalue and eigenvector, respectively, and let R denote the rank of matrix S. During relevance judging parameter determination step 14, unit 120 calculates the similarity $r_i$ between index vector $f_i$ in the vector set $\Omega_1$ and $\Omega_0$, and vector set $\Omega_1$ derived from query Q in accordance with Equation (2):

$$r_i = \left[ \frac{\sum_{m=1}^{L} \lambda_m (\phi_m^T f_i)^2}{\sqrt{\sum_{m=1}^{L} \lambda_m^2 \|f_i\|^2}} \right]^{1/2} \qquad (2)$$

Where $(\phi_m^T f_i)$ denotes inner products. Unit 120 measures, i.e., calculates the similarity $r_i$ for all the index vectors (numbering $2^N-1$) which can be generated from query Q that has N index terms. To make the measurement, unit 120 experimentally determines in an iterative manner three parameters L, $\alpha$ and $\beta$ which are described below.

In Equation (2), L, is the number of eigenvalues and eigenvectors which are used. L dimensional subspace is spanned by L eigenvectors as basis vectors; L thus has minimum and maximum values 1 and R, respectively. It is advantageous for the value of L to be as small as possible, to reduce the processing time of unit 120 in retrieving a document from file 130, while achieving high performance.

Each eigenvalue has an upper limit value $\beta$. The eigenvalues scale, that is, weight, the similarity calculation of Equation (2). However, use of raw calculated eigenvalues does not always produce a favorable result. Consequently, the eigenvalues have a predetermined, selected upper limit value of β. All eigenvalues greater than the predetermined value β are clipped to β irrespective of the order needed to obtain the optimal result. The value of β is experimentally determined from sequential numbers in a range from a first constant value to a second constant value.

Whether or not a given document is relevant to the query Q, is determined by whether the similarity of the document index vectors and the vector set $\Omega_1$ exceeds a threshold α. The threshold α, which varies in steps from 0 to 1, is experimentally determined.

FIG. 1B is a detailed flow chart of iterative operations computer 100 performs during block 14 to determine the values of L, α and β which yield the document that is closest to Boolean request Q. During relevance judging parameter determination step 14, the relevance of a document to the Boolean query Q is judged by using all the possible index vectors while the values L, β and α are varied in sequence. The values L, β and α which maximize an evaluation measure (referred to as the F-measure) are obtained.

In connection with the $2^N-1$ index vectors associated with the documents which can be retrieved, A (a number known prior to the retrieval process beginning) denotes the number of relevant index vectors, B is the number of index vectors judged as being relevant as a result of the similarity value $r_i$, computed from Equation (2) (i.e., the number of index vectors having a similarity value that exceeds the threshold α) and C is the number of relevant index vectors judged as being relevant to query Q within B. In the previous example relating to the restaurants in Shibuya, the relevant document index vectors are (1,0,1,1,), (1,1,0,1), and (1,1,1,1), so A=3. Then, unit 120 computes a recall "R" as R=C/A, and a precision "P" as P=C/B. In the case when R and P have equal weights, unit 120 computes the F-measure as:

$$F=2\times R\times P/(R+P) \qquad (3).$$

More particularly, when block 14 is first entered during operation 16, unit 120 retries from its memory 122 the initial values of L, α and β, which are L−1, α=0 and β=the first constant. Then, unit 120 advances to operation 17 during which unit 120 calculates the similarity $r_i$ in accordance with Equation (2) for the initial values of L, α and β for every index vector $f_i$ in the vector set $\Omega_1$ and $\Omega_0$. Then, during operation 18, calculation unit 120 calculates A, B, C, R and P in accordance with the previously discussed principles using the value of $r_i$ calculated during step 17 and the value of threshold α. Then, during operation 19, calculation unit 120 calculates the F measure from the values of R and P determined during operation 18. Unit 120 calculates F in accordance with Equation (3). The value of F calculated during operation 18 is stored in the RAM of memory system 122 along with the values of L, α and β which caused F to be calculated.

Then during operation 20, unit 120 determines if calculation unit 120 has performed operations 17, 18 and 19 for all combinations of L, α and β. If unit 120 determines during operation 20 that all combinations of L, α and β have not been processed, unit 120 advances to operation 21 during which the value of one of L, α or β is incremented. Operations 17–19 are then repeated with the incremented value of L, α or β. Unit 120 repeats operations 17–19 until operation 20 signals all possible values of L, α and β have been considered. When operation 20 signals all possible values of L, α and β have been considered, unit 120 advances to operation 21 during which unit 120 determines the maximum stored values of F (i.e., $F_{max}$) and the values of L, α and β associated with $F_{max}$. The values of L, α and β associated with $F_{max}$ thus complete the transposition of Boolean query Q into the vectors of set $\Omega_1$. After unit 120 has completed operation 21, unit 120 advances to retrieval step 15, FIG. 1A.

During retrieval step 15 (FIG. 1A), unit 120 determines the relevance, i.e., similarity, is judged of each of the documents stored in document file 130 with the transposed query. Unit 120 outputs the similarity as a retrieved result. Unit 120 determines the similarity by using Equation (2), where $f_i$ denotes the index vector of the document i in file 130, and the values L, α and β determined during operation 21 are employed as the parameters. The other points are the same as in the prior art.

Figure 2:
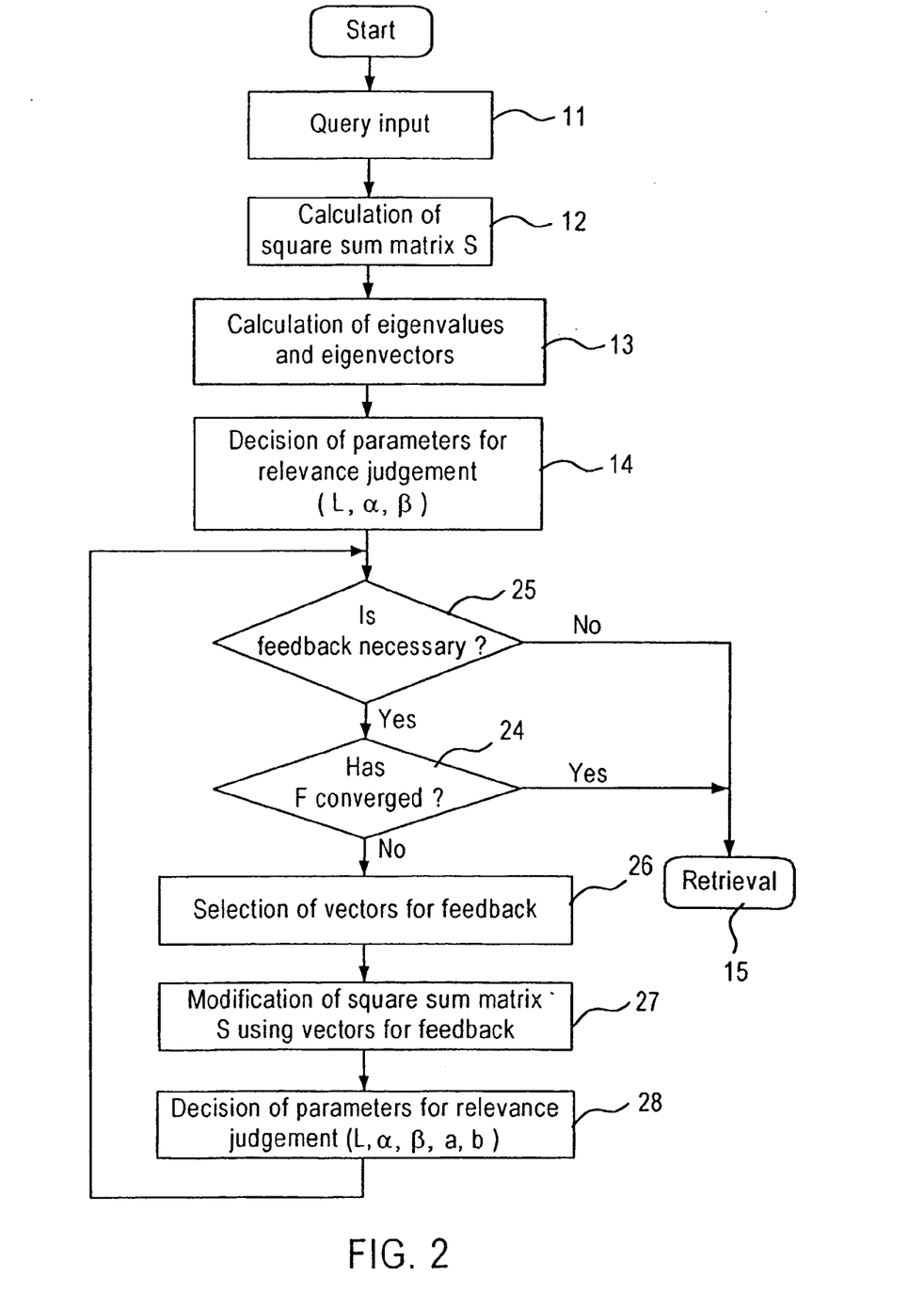
FIG. 2 is a flow chart of operations of a second preferred embodiment of the present invention.

FIG. 2 is a flow diagram of operations that unit 120 performs in accordance second preferred embodiment of the present invention. Blocks 11–14 of FIG. 2 are the same as blocks 11–14 of FIG. 1A. Thus, during block 11 input 110 supplies a Boolean logic query Q to calculation unit 120; during block 12 unit 120 the step of calculates a square sum matrix; and during block 13, unit 120 calculates eigenvalues and eigenvectors. During block 14, unit 120 determines parameters as in the embodiment of FIG. 1A. Thus, an inputted query Q in Boolean logic form is transformed into a vector form by the processing blocks 11 through 14.

Then, unit 120 advances to block 25 during which unit 120 judges whether or not feedback is necessary based on the result obtained from relevance judging parameter determination step 14. Unit 120 determines that feedback is necessary if unit 120 determines (1) an index vector is judged as irrelevant, in spite of being included among relevant index vectors, i.e., is in vector set $\Omega_1$, or (2) an index vector is judged as relevant in spite of being included among irrelevant index vectors, i.e., is in vector set $\Omega_0$, or (3) evaluation measure F does not converge in a second or later iterative process indicated by block 24. If, during operation 24, unit 120 determines that evaluation measure F has converged, or if measure F is being reduced each time feedback is repeated, feedback is not executed and the program advances to retrieval operation 15 that is performed as described in connection with FIG. 1A. Retrieval operation 15 is also performed if unit 120 determines during step 25 that feedback is not necessary.

If, during operation 25, unit 120 determines feedback is necessary and determines, during operation 24, that F has not converged, unit 120 advances to block 26 during which unit 120 selects vectors for the feedback operation. Unit 120 then advances to block 27 during which unit 120 modifies the square sum matrix using the L, α, β, a and b feedback vectors. Unit 120 then advances to block 28 during which the unit determines parameters for enabling similarities, i.e., relevance, judgements to be performed.

During feedback vector selection step 26, unit 120 determines the index vectors to be fed back, i.e., unit 120 selects the index vectors obtained as undesirable results. Thus, during step 26, unit 120 creates the vector set associated with the feedback operation. One way of performing operation 26 is to let $r_{min}$ denote the minimum value of the similarity of the relevant index vector, and $r_{max}$ denote the maximum value of the similarity of the irrelevant index vector. In such a case, the relevant index vector whose last result similarity is less than $r_{max}$ (or whose first iteration result from block 14 is less than $r_{max}$) is added to set $\Omega^+$, whereas the irrelevant index vector whose similarity is greater than $r_{min}$ is added to set $\Omega^-$. The sets $\Omega^+$ and $\Omega^-$ are held empty during the first iteration.

During square sum matrix modification step 27, unit 120 calculates Equation (4) in accordance with:

$$S_1 = S + a \sum_{f \in \Omega^+} ff^T - b \sum_{f \in \Omega^-} ff^T, \quad (4)$$

where a and b are parameters unit 120 calculates, and the eigenvalues and eigenvectors of the matrix $S_1$ are obtained. In Equation (4), S denotes the square sum matrix that unit 120 calculates during block 12. During relevance judging parameter determination step 28, unit 120 performs processing which is the same as that of the relevance judging parameter determination step 14. In addition, during step 28, unit 120 calculates an evaluation measure while varying the values of the parameters a and b, so as to determine the values of parameters L, α, β, a and b that maximize the evaluation measure. Unit 120 determines the values of a and b during operation 28 in the same way that the unit determines A and B during operation 18, FIG. 1B.

After unit 120 performs step 28, the unit again performs step 25, to determine whether or not further feedback is necessary. Unit 120 repeats operations 24–28 in sequence until the unit performs retrieval step 15, after determining further feedback is not necessary or that F has converged.

Figure 3A:
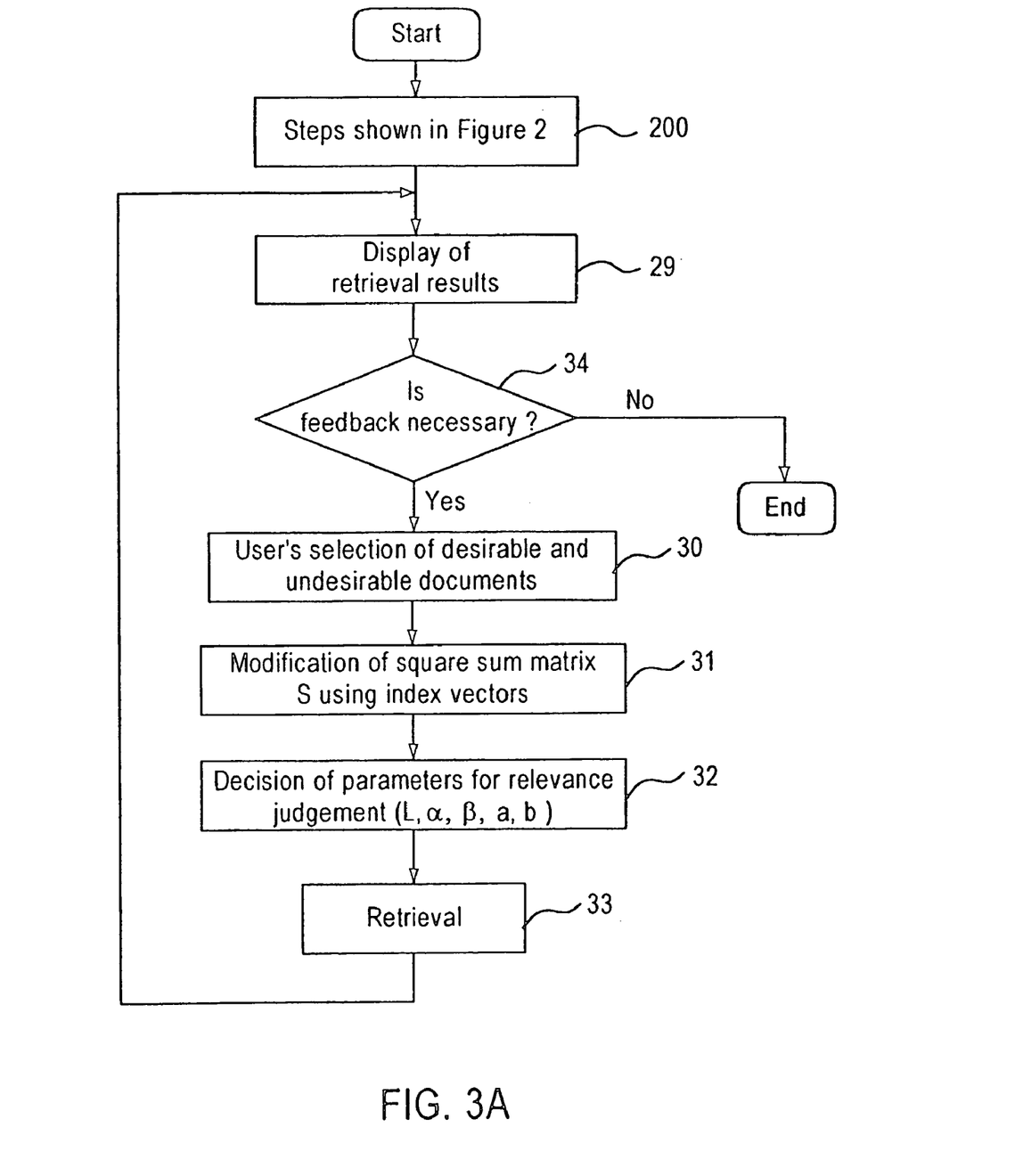
FIG. 3A is a flow chart of operations of a third preferred embodiment of the present invention.

FIG. 3A is a flow diagram of steps general purpose computer 100 is programmed to take in connection with a third embodiment of the present invention. Initially, program 122 actives unit 120 to perform block 200, during which unit 120 executes the steps shown in FIG. 2. Memory 122 then, during operation 29, activates unit 120 and display output device 140, so the display provides a user with a visual indication of a retrieval result. Then, based on the displayed retrieval information, the user, during operation 34, decides whether or not feedback concerning the retrieval result is necessary by selectively supplying a signal to unit 120 via input 110. If the user decides feedback is necessary, the user activates input 110 and unit 120 responds to input 110 to advance to block 30. During block 30, the user responds to the output display 130 to activate input 110 to cause unit 120 to be supplied with a signal that indicates the displayed document is desirable or undesirable. Then unit 120 advances to block 31, during which unit 120 modifies a square sum matrix by using index vectors $f_i$ on the basis of query Q and the input from the user which input 110 supplied to unit 120 during operation 30. Then unit 120 advances to block 32 during which unit 120 determines parameters L, α, β, a and b for relevance judgement. Memory 122 then activates unit 120 to perform block 33, during which unit 120 retrieves a document from file 130.

In FIG. 3A, retrieval operation 33 is first executed in the same way as retrieval operation 15, per FIGS. 1A and 2. Unit 120 activates output 140 to present the retrieval result to the user during retrieval result display step 29. The user evaluates the displayed result, and decides whether or not feedback is necessary. If (1) a document desired by the user is in the retrieval result, or (2) the user wants the retrieved documents which are relevant to the desired document to be re-retrieved, or (3) the user decides that an undesired document is erroneously in the retrieval result, the user designates such a desired or undesired document during user feedback selection step 30. Each document desired by the user is referred to as a "positive document," whereas each undesired document is referred to as a "negative document." Two or more of such documents can be designated. Index vectors included in the positive documents are added together in vector set $\Omega^{pf}$, whereas index vectors included in the negative documents are added together in vector set $Q^{nf}$. The vector sets $Q^{pf}$ and $\Omega^{nf}$ are initially empty, i.e., have zero values.

During square sum matrix modification step 31, unit 120 computes the square sum matrix in accordance with Equation (5):

$$S_2 = S_1 + a_1 \sum_{f \in \Omega^{pf}} ff^T - b \sum_{f \in \Omega^{nf}} ff^T. \quad (5)$$

where, $a_1$ and $b_1$ are calculated parameters, and the eigenvalues and eigenvectors of the matrix $S_2$ are obtained, and symbol $S_1$ denotes the square sum matrix that unit 120 calculates during block 27 (FIG. 2).

During relevance judging parameter determination step 32, unit 120 performs the same processing that the unit performed during relevance judging parameter determination step 14. In addition, during step 32, unit 120 calculates evaluation measures for different values of parameters $a_1$ and $b_1$. Unit 120 determines the values of parameters $a_1$ and $b_1$ which result in evaluation measure F being maximized, in a manner similar to that as described in connection with FIG. 1b. Step 32 differs from step 14 because during step 32 unit 120 (1) removes any index vector of any negative document that is included in the index vector set $\Omega_1$, and (2) adds an index vector of a positive document to set $\Omega_1$ if the index vector of the positive document is not included in set $\Omega_1$. The retrieval step 33 is executed the same as retrieval step 15, FIGS. 1A and 2. During step 29. unit 120 supplies the retrieval result of step 33 to the display of output 240.

In FIG. 3, during feedback designation step 30, square sum matrix modification step 31, relevance judging parameter determination step 32 and retrieval step 33, the components of the index vectors of the positive and negative documents represent whether or not query terms included in a query are employed as index terms in the documents. However, all extant terms in each document can be adopted as the vector components.

Figure 3B:
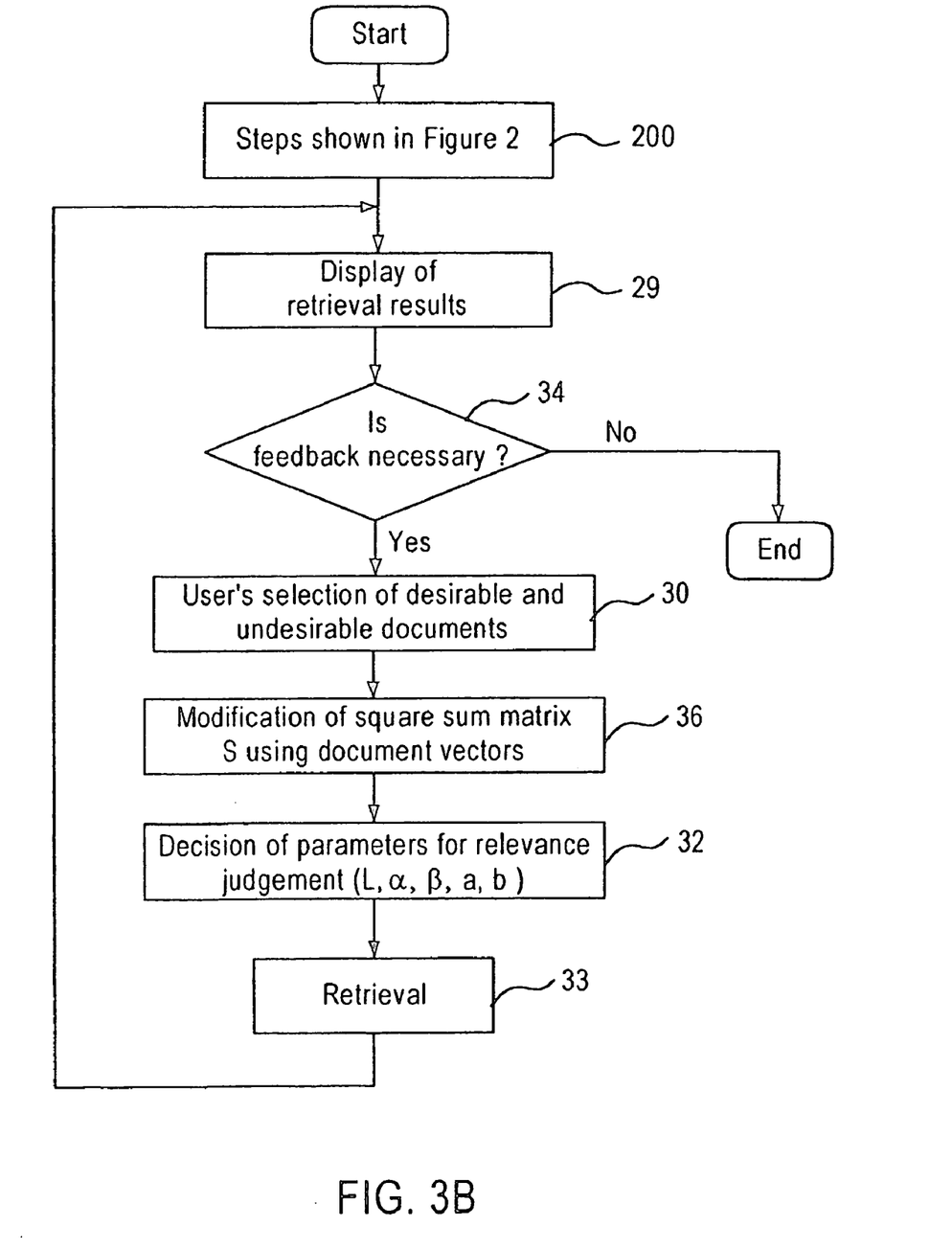
FIG. 3B is a flow chart of operations of a fourth preferred embodiment of the present invention.

Next, an example in which the extant terms in each document are handled as vectors is described in connection with operations shown in FIG. 3B. In the operations of FIG. 3B, the vectors of each of the positive and negative documents are denoted by g. Since the index terms are usually different in every document, the document index terms need to be sorted to enable the components of vectors g to correspond to the same terms even in different documents. During step 30, after a user determines during operation 34 that feedback is necessary, the user determines the respective vector sets $\Omega^{pg}$ and $\Omega^{ng}$ of the positive and negative documents, i.e., during operation 30, the user selects the desired (positive) and undesired (negative) documents.

Then during operation 36, unit 120 modifies the square sum matrix and calculates the eigenvalues and eigenvectors of matrix $S_3$ in accordance with:

$$S_3 = S_1 + a_2 \sum_{g \in \Omega^{pg}} gg^T - b_2 \sum_{g \in \Omega^{ng}} gg^T. \quad (6)$$

The dimensions of the rows and columns of matrix $S_1$ in Equation (6) are usually smaller than those of the rows and columns of the vectors g. Therefore, after the size of the matrix $S_1$ is adjusted, the rows and columns need to be moved so that the i-th column and i-th row of matrix $S_1$ correspond to the same index term as the index term of the i-th components of vectors g. If the term corresponding to the i-th components of vectors g is not employed in a query, the i-th column and i-th row of the matrix $S_1$ is set to zero.

After operation 36, unit 120 advances to relevance judging parameter determination step 32 which is executed in the same way as described in connection with operations 32 and 28 in FIGS. 2 and 3B. During retrieval step 33, unit 120 judges relevance as to each of the documents stored in file (i.e., database) 130, and outputs a retrieval result to output 140. During step 33 unit 120 calculates similarity in accordance with Equation (7):

$$r_i = \left[ \frac{\sum_{m=1}^{L} \lambda_m (\phi_m^T g_i)^2}{\sqrt{\sum_{m=1}^{L} \lambda_m^2 \|g_i\|^2}} \right]^{1/2}. \quad (7)$$

In Equation (7), $g_i$ denotes the vector of document i and values determined as stated above are employed as parameters. The other points can be the same as in the prior art, in performing the present invention.

Figure 4:
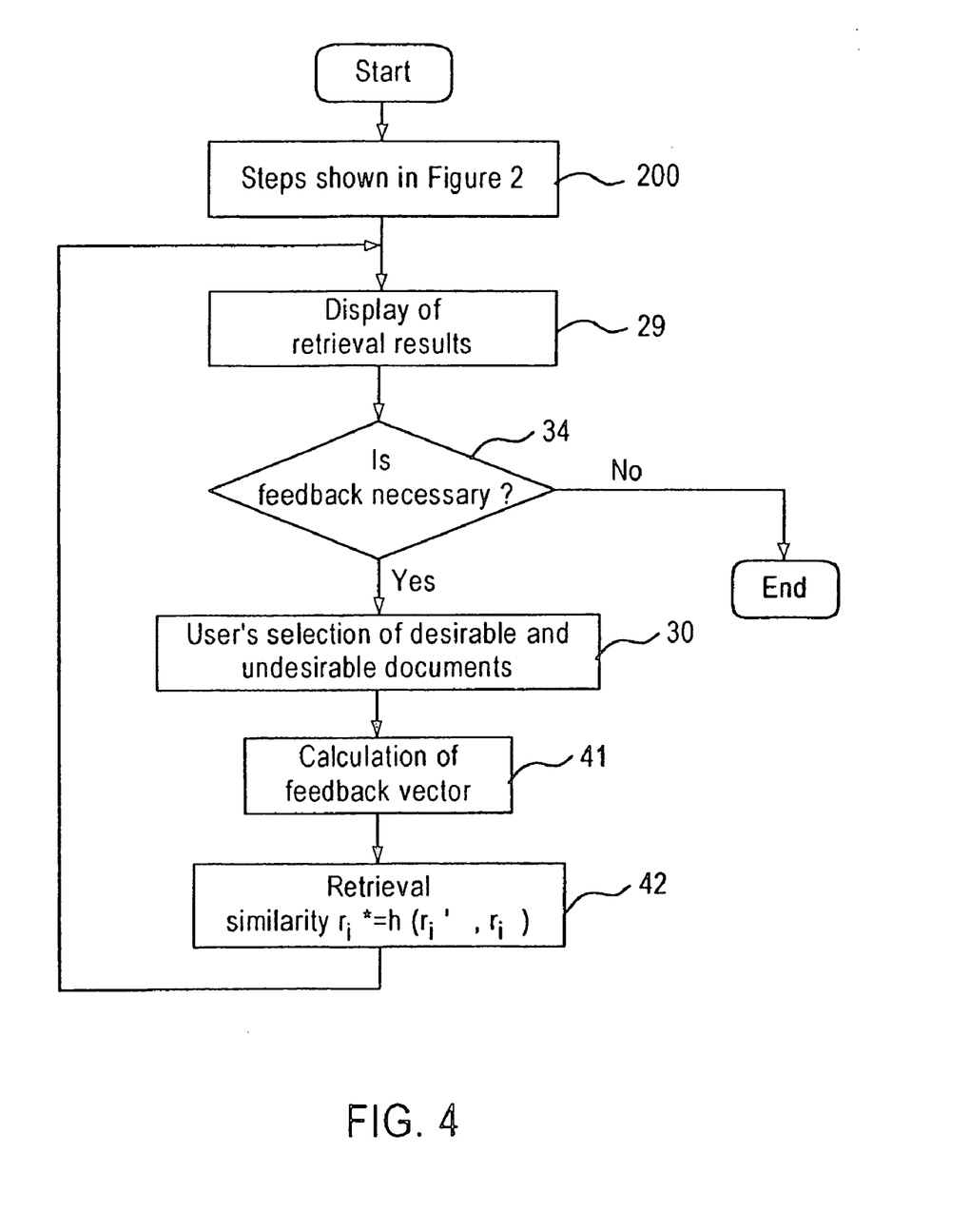
FIG. 4 is a flow chart of operations of a fifth embodiment of the present invention.

FIG. 4 is a flow diagram of operations that unit 120 performs to retrieve documents in accordance with a fifth embodiment of the present invention. Initially, unit 120 performs the retrieval steps of FIG. 2, as indicated by block 200. Then, unit 120 supplies the retrieved documents to the display of output 140, as indicated by block 29. During operation 34, a user responds to the displayed documents and determines if feedback is necessary. Then, during operation 30, the user selects the desirable and undesirable documents. Then unit 120 advances in sequence to steps 41 and 42 during which the unit respectively calculates a feedback vector and executes document retrieval.

Processing steps 200, 29, 34 and 30 of FIG. 4 are the same as the corresponding steps in FIGS. 3A and 3B. During feedback vector calculation step 41, unit 120 first calculates an average vector $g^p$ in the vector set $\Omega^{pg}$ of positive documents and an average vector $g^n$ in the vector set $\Omega^{ng}$ of negative documents. Subsequently, during step 41 unit 120 calculates the feedback vector g' in accordance with Equation (8):

$$g' = a_3 g^p - b_3 g^n \quad (8),$$

where $a_3$ and $b_3$ are parameters.

During retrieval step 42, unit 120 first calculates the similarity $r'_i$ between the feedback vector g' and the index vector $g_i$ of a document to-be-retrieved, i. Unit 120 calculates $r'_i$ in accordance with Equation (9):

$$r'_i = g_i^T g' / (\|g_i\| \|g'\|) \quad (9),$$

where, T denotes transpose, and
 $\|g'\|$ represents the norm of vector g'.

Subsequently, during retrieval step 42 unit 120 determines a similarity $r^*_i$ for the document to-be-retrieved, i, as a function, such as a weighted average. Unit 120 calculates the similarity $r_i$ for the document to-be-retrieved, i, by modifying block 15 (in FIGS. 1A and 2), in accordance with Equation (10):

$$r^*_i = h(r_i, r'_i) \quad (10).$$

During retrieval step 42 unit 120 also sorts retrieved documents in accordance with the degrees of document relevance. The documents are displayed at output 140 during operation 29, so that the documents most relevant to the user's input query Q are displayed first and the least relevant are displayed last. Optimal values are determined while unit 120 varies the values of parameters $a_3$ and $b_3$. This can be performed by a technique having heretofore been practiced.

The present invention is very effective as described below in connection with a first example wherein a query Q in Boolean logic form consisting of eight query terms, $w_1$–$w_8$, is represented as:

Q=($w_1$ OR $w_2$ OR $w_3$ OR $w_4$) AND ($w_5$ OR $w_6$) AND $w_7$ AND $w_8$

Because there are eight index terms in query Q, there is a possibility of ($2^{8-1}=255$) index vectors existing. 45 of the 255 index vectors are relevant to query Q. The 255 index vectors are respectively judged as to whether or not they are relevant to the query Q, by using the program of FIGS. 1A and 1B. Then, an F-measure of 100% was obtained. This signifies that a relevant index vector set and an irrelevant index vector set could be perfectly distinguished. The F-measure in the case of applying the vector space model in the prior art, was 87.1%. Accordingly, retrieval performance has been remarkably improved.

Now consider a second exemplary Boolean logic query:

Q=(($w_1$ OR $w_2$ OR $w_3$ OR $w_4$) AND ((NOT $w_5$) OR $w_6$) AND $w_7$ AND $w_8$.

In the prior art vector space model, the F-measure of this example is 85.4% and 94.3% for the embodiment of FIGS. 1A and 1B. When the program of FIG. 2 was further performed for this second query Q, an F-measure of 100% was obtained. These facts signify that the present invention has attained the distinguishability between relevant documents and irrelevant documents, equivalent to the Boolean model, while keeping the advantages of the prior-art vector space model.

While there have been described and illustrated specific embodiments of the invention, it will be clear that variations in the details of the embodiments specifically illustrated and described may be made without departing from the true spirit and scope of the invention as defined in the appended claims. For example, the principles of the invention can be used for information retrieval in general and is not limited to document retrieval.

What is claimed is:

1. A method of retrieving at least one of a desired document item and an information item from at least one of a plurality of document items and information items, items being identified by item index vectors, the method being performed in response to a query including plural query terms, the query terms being related to each other in Boolean logic form, the method comprising:

transforming the query terms in Boolean logic form into a transformed vector form;

retrieving the desired item information in response to similarity measurements of the transformed vector form of the query terms and the item index vectors; and outputting the retrieved desired item information to an output unit, wherein the transforming step comprises:

(a) calculating a square sum matrix by the using a plurality of first index vectors, the first index vectors having components indicating the presence or absence of each of the plural query terms, the square matrix being calculated on the basis of all the first index vectors which are generated from said query; and (b) calculating eigenvectors and eigenvalues of the square sum matrix.

2. The method of claim 1 wherein the transforming step further includes selecting basis vectors from the eigenvectors, the basis vectors constituting a subspace.

3. The method of claim 2 wherein the similarity measurements include calculating inner products between the first index vectors and the basis vectors, and weighted coefficients employing the eigenvalues.

4. The method of claim 3 wherein the retrieving step includes comparing the similarity measurement with a predetermined threshold to determine whether or not each of said items relevant to said query.

5. The method of claim 4 further including varying the weighted coefficients and the threshold to maximize a predetermined evaluation measure.

6. The method of claim 1, further comprising the step of modifying said square sum matrix in response to at least one of (a) the first index vector being judged as being irrelevant in spite of being relevant to said query and (b) the first index vector being judged to be relevant in spite of being irrelevant to said query.

7. The method of claim 1, further comprising modifying said square sum matrix in response to at least one of (a) a user deciding that a retrieval item agrees with the query and (b) deciding that a retrieval item does not agree with the query.

8. The method of claim 1, further comprising modifying said square sum matrix on the basis of another item index vector having a component that indicates the presence or absence of each index term included in each of said items, and which corresponds to (a) the document judged by a user to agree with the user's request, or (b) the document judged by the user to disagree with the user's request.

9. The method of claim 8, wherein the transforming step further includes selecting basis vectors from eigenvectors, the basis vectors constituting a subspace and further comprising:

(a) calculating a feedback vector by the using an average vector of the another index vectors which are included in said item judged by said user to agree with the user's request, or an average vector of the another index vectors which are included in said item judged by said user to disagree;

(b) measuring a second similarity between each of the item index vectors and the feedback vector;

(c) calculating a third similarity by using said similarity measurement and the second similarity, wherein the similarity measurements include calculating inner products between the first index vectors and the basis vectors, and weighted coefficients employing the eigenvalues; and (d) judging whether or not each item is relevant to said query by comparing the third similarity with a predetermined threshold.

10. The method of claim 1, wherein said square sum matrix is calculated in accordance with:

$$S = \sum_{f_i \in \Omega_1} f_i f_i^T$$

where $f_i$ denotes index vectors, of said items relevant to said query, and $\Omega_1$ denotes a set of all said' first index vectors which the relevant items can take.

11. Apparatus for retrieving at least one of a document item and an information item from at least one of a plurality of document items and information items, each of the items being identified by an item index vector, the apparatus, comprising:

(a) an input unit for accepting a query including plural query terms related to each other by Boolean logic;

(b) a data processing unit connected to be responsive to the input unit, the data processing unit being programmed to be responsive to the query for transforming the query into vector form, and for measuring the similarities of the item index vectors and the vector form of the query to determine which of the items correspond with the query, and (c) an output unit connected to be responsive to the data processing unit for providing an indication of the determination of which of the items correspond with the query wherein the data processing unit is programmed to:

(A) calculate a square sum matrix by using (i) a first index vector having a component indicating the presence or absence of each query term included in said query, and (ii) all of the first indexvectors which documents relevant to said query can take; and (B) calculate eigenvectors and eigenvalues of the square sum matrix.

12. The apparatus of claim 11 wherein the data processing unit is programmed to:

(C) select basis vectors which constitute a subspace, from the eigenvectors;

(D) measure a first similarity between each of the items and said query on the basis of inner products between the item index vectors and the basis vectors, and weighted coefficients employing the eigenvalues;

(E) compare the first similarity with a predetermined threshold so as to determine whether or not each of said items is relevant to said query; and (F) output a result of the judgement to the output unit.

13. The apparatus of claim 12, wherein the data processing unit is programmed for modifying said square sum matrix in response to at least one of (a) the first index vector being judged irrelevant in spite of being relevant to said query and (b) the first index vector being judged relevant in spite of being irrelevant to said query.

14. A computer-readable medium storing instructions which, are executable by a processor to cause the processor to assist in retrieving at least one of a document item and an information item from at least one of a plurality of document items and information items, each of the items being identified by an item index vector, the retrieval being in response to a query including plural query terms related to each other by Boolean logic, the instructions being arranged for causing the data processing unit to:

transform the query into vector form,
measure the similarities of the item index vectors and the vector form of the query to determine which of the items correspond with the query; and
output the determined items to an output unit,
wherein the transform comprises:
- (a) calculating a square sum matrix by the using a plurality of first index vectors, the first index vectors having components indicting the presence or absence of each of the plural query terms, the square matrix being calculated on the basis of all the first index vectors which are generated from said query; and
- (b) calculating eigenvectors and eigenvalues of the square sum matrix.

15. The computer-readable medium of claim 14 wherein the instructions are arranged for causing the processor to modify said square sum in response to at least one of (a) the first index vector being judged irrelevant in spite of being relevant to said query and (2) the first index vector being judged relevant in spite of being irrelevant to said query.

16. The computer-readable medium of claim 15 wherein the instructions are arranged for causing the processor to modify said square sum matrix in response to at least one of (a) the first index vector being judged irrelevant in spite of being relevant to said query, and (b) the first index vector being judged relevant in spite of being irrelevant to said query.

* * * * *